United States Patent [19]
Boyd

[11] Patent Number: 5,901,651
[45] Date of Patent: May 11, 1999

[54] SELF-POWERED TROLLEY FOR STRINGING LINES BETWEEN UTILITY POLES

[76] Inventor: Jimmy R. Boyd, 3051 E. Ten Mile Rd. Lot No. 125, Warren, Mich. 48091

[21] Appl. No.: 08/937,876

[22] Filed: Sep. 29, 1997

[51] Int. Cl.⁶ .................................................... H02G 1/00
[52] U.S. Cl. ........................................ 104/112; 254/134.5
[58] Field of Search ................................ 104/87, 89, 93, 104/112, 114, 117.1, 138.2, 173.1, 173.2, 176, 177, 178, 183, 229, 238; 29/241; 191/12 R; 254/134.3 R, 134.5, 134.3 PA; 294/19.1; 105/148, 150

[56] References Cited

U.S. PATENT DOCUMENTS

| | | | |
|---|---|---|---|
| 628,994 | 7/1899 | Schottle et al. | 254/134.5 |
| 683,515 | 10/1901 | Stewart | 254/134.5 |
| 695,504 | 3/1902 | Stewart | 254/134.5 |
| 798,602 | 9/1905 | Detchon | 254/134.5 |
| 3,672,636 | 6/1972 | Parsen | 254/134.3 R |
| 3,861,650 | 1/1975 | Jackson | 254/134.3 R |
| 4,386,759 | 6/1983 | Grover et al. | 254/134.5 |

Primary Examiner—Mark T. Le
Attorney, Agent, or Firm—John R. Benefiel

[57] ABSTRACT

A method and trolley for restringing downed utility wires between utility poles in which a self-powered trolley is hooked onto a remaining intact line and caused to traverse along the line by motor driven pulley wheels engaging the intact line, while towing a P-line towards the next pole. A bumper contact operates a switch to turn off the motor when the trolley reaches the vicinity of the next pole. The motor is powered by a battery in a lower housing, the lower housing mounted below an upper housing carrying the wheels and motor, with a space therebetween allowing the trolley to be hooked onto the intact line. The P-line is used to pull the replacement line to the next pole.

7 Claims, 2 Drawing Sheets

SELF-POWERED TROLLEY FOR STRINGING LINES BETWEEN UTILITY POLES

BACKGROUND OF THE INVENTION

This invention concerns restringing of downed utility wires such as power lines, telephone lines, etc. During storms, it is common for falling trees, limbs, and windblown debris to sever sections of utility lines.

A linesman must then manually restring sections of the lines in the field without the use of heavy line stringing equipment.

The standard practice for many years has been for a flexible cord (called a P-line) to be manually thrown from one pole over the crosspieces of the next. The P-line is then used to pull a heavier pulley line across to the next pole, that line then used to pull the heavy wire or cable itself across to the next pole.

This is a tedious and time-consuming task, particularly where tree limbs are growing close to the lines, and is a reason that repairs proceed slowly.

It is the object of the present invention to provide a process and device for restringing lines between utility poles enabling much speedier and easier restringing of the line sections.

SUMMARY OF THE INVENTION

The above object is achieved by a self-powered trolley configured to be hooked onto a remaining wire with a pair of spaced apart pulley wheels rolling on the wire. The trolley is battery-powered so as to drive both pulley wheels to roll along the wire, pulling a P-line behind it. The trolley is configured with upper and lower housing sections connected along one side only to very stably rest and ride along the remaining wire, being bottom weighted by the battery in the lower housing.

A bumper switch turns off the trolley drive motor when the trolley reaches the next pole.

The trolley may also be equipped with a light for night time use.

Another linesman at the next pole may also retrieve the trolley and pass it onto the next line section to travel to the next pole, and so on.

The P-line is then used to string either a heavier pulling rope used to restring heavy wire or cable, or itself used to restring light lines such as a telephone or a cable television lines.

The trolley may be made in more than one size to be suited to different wire or cable size ranges.

DETAILED DESCRIPTION

Figure 1:
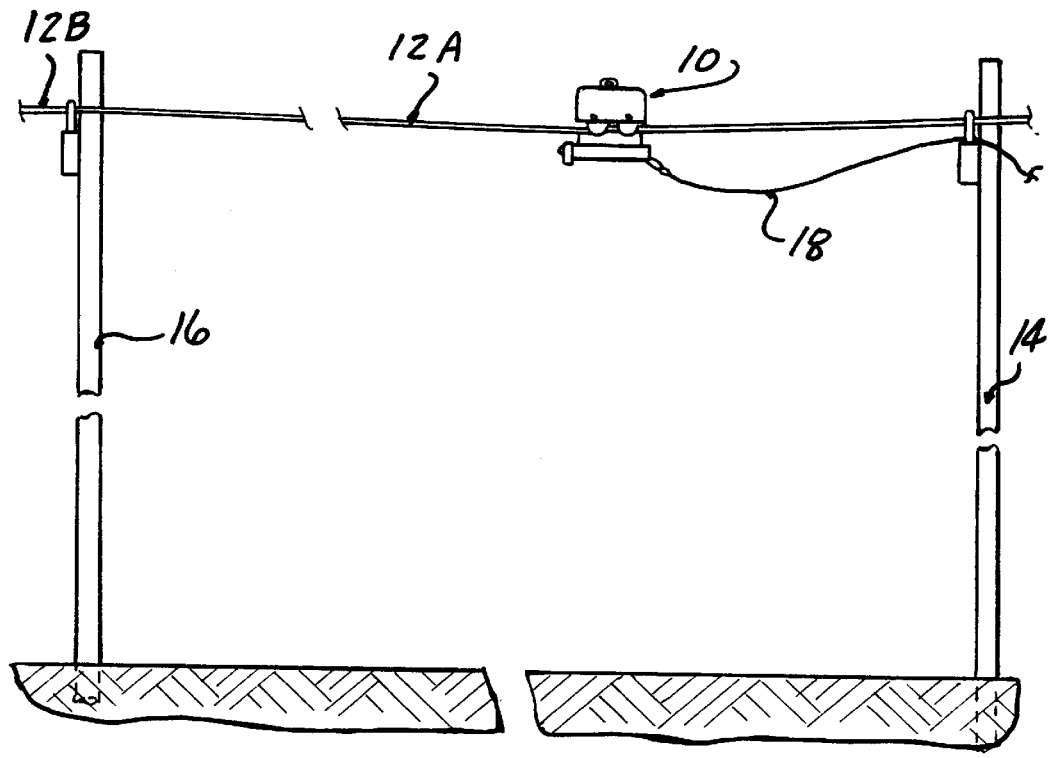
FIG. 1 is an elevational view of a trolley according to the invention traversing a utility line string between two utility poles and towing a P-line.

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to the drawings, a trolley 10 according to the present invention is shown traversing a section of line 12A strung between a pair of utility poles 14, 16. The trolley 10 is towing a "P-line" 18 attached to the trolley 10 so as to be brought to the second pole 16, where a linesman can move it to the next section 12B.

The P-line 18 so strung can be used either to pull a heavier rope for heavy cables, or to pull a light gauge line for restringing.

The trolley 10 is self-powered traversing each line segment 12.

Figure 3:
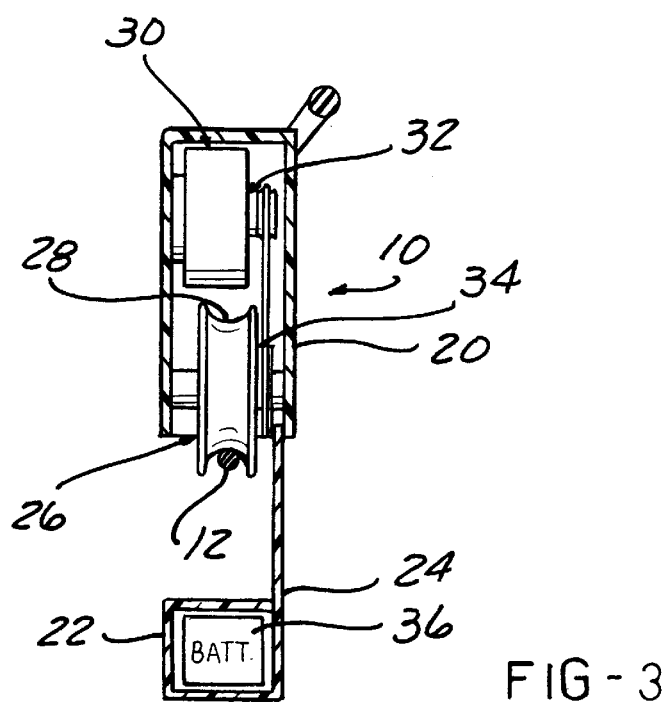
FIG. 3 is a transverse sectional view of the trolley.
Figure 2:
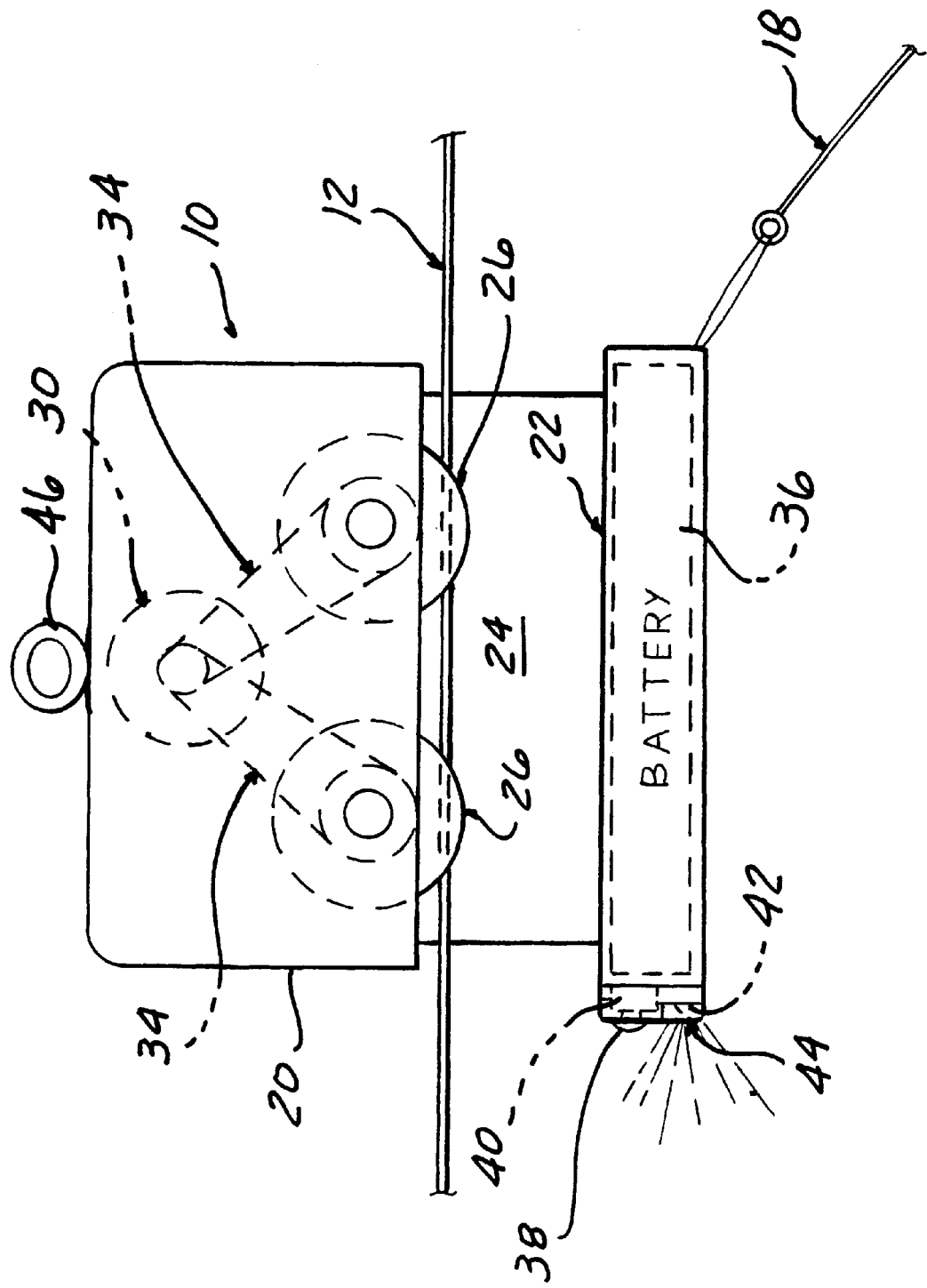
FIG. 2 is an enlarged side elevational view of the trolley resting on a line segment.

FIGS. 2 and 3 show further details of the trolley 10, which has a roughly "C" shaped configuration allowing it to be hooked onto the line 12.

The C-shaped configuration is formed by a molded plastic upper housing 20 and lower housing 22, separated vertically but joined with a connector section 24, all of these parts preferably constructed of non-conductive molded plastic.

The gap between the upper housing 20 and lower housing 22 is open to allow the upper housing to be placed over or hooked to the line segment 12.

A pair of elastomeric rollers 26 each having a grooved perimeter 28 protrudes from the underside of the upper housing 20, the rollers 26 mounted for rotation therein about an axis perpendicular to the vertical axis of the trolley 10. The rollers 26 are aligned along the lengthwise axis of the trolley 10, spaced apart in the fore and aft direction such as to rest on the wire at spaced locations and stabilize the trolley 10 against tipping by the pulling resistance of the P-line 18.

The rollers 26 are both powered by an electric motor 30 also mounted in the upper housing 20, and having an output shaft 32 driving belt 34 coupled to the rollers 26 to rotate the same.

The lower housing 22 contains a large rechargeable battery 36 which is used to power the motor 30 connected by a suitable electrical connection (not shown), the battery 36 also acting as a stabilizer weight.

A bumper contact 38 at front end of the lower housing 22 operates an on/off switch 40 to turn the motor 30 on and off.

A lamp 42 behind a clear window 44 allows illumination for night time use.

The bumper contact 38 allows either manual operation to turn the motor 30 on or automatic shut off when contacting an insulator at the far end of the line section 12, acting to automatically shut off the motor 30 when the trolley 10 reaches the next pole.

The lower housing 22 and battery 36 should be substantially heavier than the upper housing 20 with the motor 30 and pulley wheels 26 so that the trolley 10 will stably hang on the line 12 when placed thereon.

The elastomeric wheels 26 should have a high frictional coefficient to afford adequate traction and of course should be electrically insulating.

The upper housing 20 may have an integral ring 46 on the top to enable a linesman to retrieve the unit as by using a "hot stick".

The trolley 10 can be made in two (or more) sizes to be adapted to different ranges of wire or cable sizes.

It can be appreciated that the trolley 10 and process according to the present invention will make repair of downed lines much easier and quicker than the primitive methods now in use.

I claim:

1. A method of restringing a electrical power line between two utility poles including the step of:

placing electrically nonconductive wheels of a self-powered trolley on an existing intact hot line, attaching a flexible cord thereto, and causing said trolley to traverse said intact hot line from the vicinity of one utility pole to the vicinity of a next utility pole, and using said flexible cord to restring another electrical power line, between said utility poles;

said step of placing said trolley on said intact hot line, including the step of hooking said trolley onto said intact hot line through an open gap on said trolley between said electrically nonconductive wheels and a lower trolley housing section constructed of an electrically nonconductive material.

2. The method according to claim 1 in placing said trolley on said intact line, said trolley is hooked onto said intact line through a space on said trolley.

3. The method according to claim 1 wherein said step of causing said trolley to traverse said intact line includes the step of driving said wheels engaged with said intact hot line with a battery powered electrical motor on said trolley to self power said trolley, and further including the step of forming said wheels of an elastomeric material to increase traction with said intact hot line.

4. The method according to claim 3 further including the step of automatically stopping said motor when said trolley reaches the vicinity of the next pole by locating an on-off bumper switch at the front of said trolley to impact an insulator at said next pole.

5. The method according to claim 3 further including the step of stabilizing said trolley by locating a battery in said lower trolley housing section to make said lower housing section heavier than an upper housing section mounting said wheels.

6. The method according to claim 4 further including the step of mounting a light at the front of said trolley.

7. The method of according to claim 1 further including the step of lifting said trolley onto said intact hot line by use of a "hot stick" engaging a feature located on the top of the trolley.

* * * * *